United States Patent
Dufour et al.

[15] 3,691,840
[45] Sept. 19, 1972

[54] TEMPERATURE-MEASURING DEVICE

[72] Inventors: Jacques Dufour, 30, rue Guersant, 75 Paris 17eme; Paul H. Perroud, c/o Laboratoire ASP, Ceng, Cedex 85, Grenoble; Jacques Petres, c/o Laboratoire ASP, Ceng, Cedex 85, Grenoble; Jean Rebiere, c/o Laboratoire ASP, Ceng, Cedex 85, Grenoble, all of France

[22] Filed: Jan. 19, 1971

[21] Appl. No.: 107,703

[30] Foreign Application Priority Data

Jan. 22, 1970 France.....................7002211
May 29, 1970 France.....................7019830

[52] U.S. Cl..................................................73/349
[51] Int. Cl..............................................G01k 1/16
[58] Field of Search....73/349, 341, 342, 340, 190 H, 73/DIG. 7, 351

[56] References Cited

UNITED STATES PATENTS 1,758,532    5/1930    Phinney......................73/349
2,627,182    2/1953    Quereau......................73/351

*Primary Examiner*—Louis R. Prince
*Assistant Examiner*—Denis E. Corr
*Attorney*—Cameron, Kerkam & Sutton

[57] ABSTRACT

In a device for measuring the temperature of a wall, a gas is fed at a given pressure and flow rate into a collector having an annular end-plate provided with passageways, there being formed between the endplate and the wall a narrow space in which a fraction of the gas injected through the passageways is heated in contact with the wall. A suction duct is located in the axis of the supply pipe for recirculating said gas fraction. The remainder of the injected gas is continuously driven outwards over the entire periphery of the annular end-plate and forms a gaseous guard ring. One or more thermocouples are placed in the suction duct for measuring the temperature of the gas in contact with the wall and one or more thermocouples are placed in the supply gas stream upstream of the annular end-plate, the function of said thermocouples being to permit direct and differential measurements.

6 Claims, 1 Drawing Figure

PATENTED SEP 19 1972 3,691,840
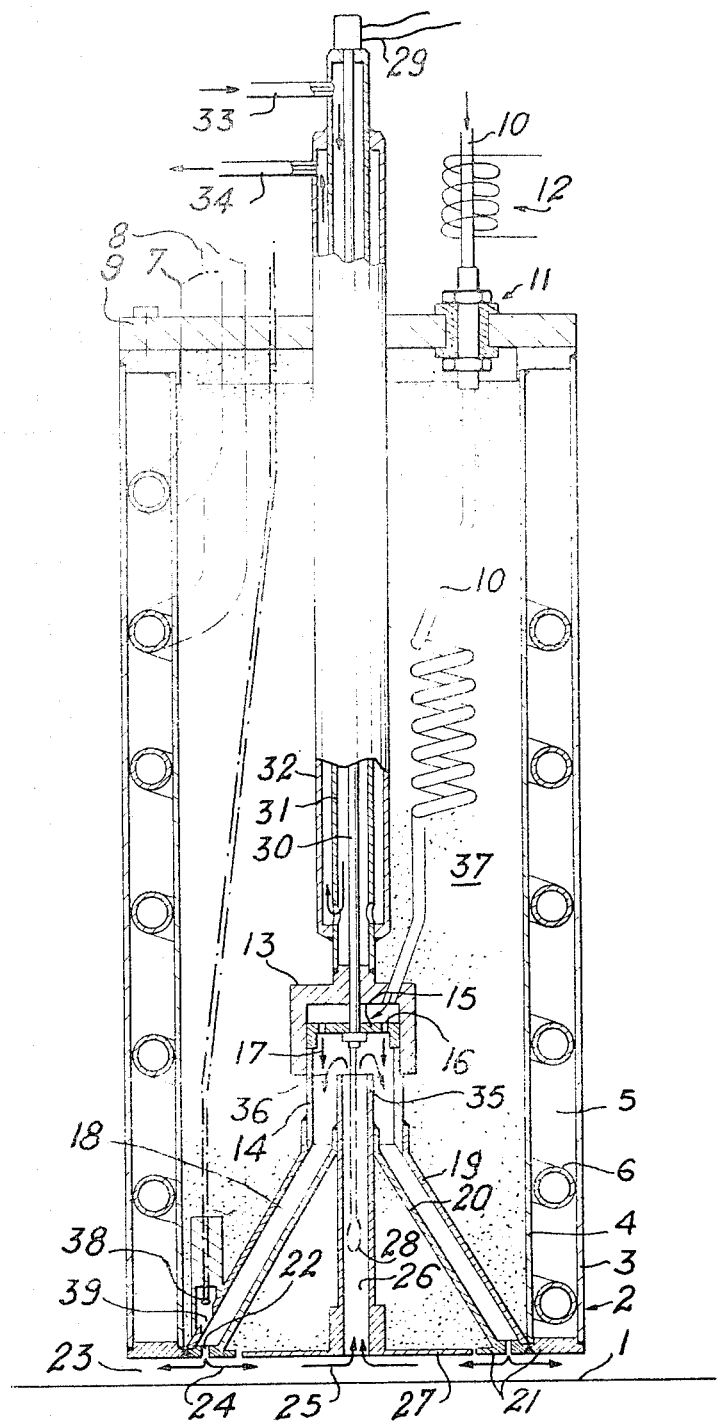

TEMPERATURE-MEASURING DEVICE

This invention relates to a device for measuring a temperature without any contact and especially the temperature of a metallic wall which is either stationary or in motion and more particularly but not exclusively a flat plate which moves within the interior of a heat treatment furnace in a continuous-rolling installation.

It is already a known practice to make use of different instruments such as pyrometers in order to carry out an optical method for measuring the temperature of a wall without any direct mechanical contact with this latter. However, these conventional instruments are not suitable when the state of surface of the wall is such that its emissive power is not well known or alternatively when said wall is surrounded by a radiating enclosure and this latter is heated to a temperature which is different from that of the wall or finally when the wall is placed in an absorbent atmosphere.

This invention is concerned with a device which overcomes the disadvantages of instruments of the prior art and in which direct measurement of the temperature of a moving wall is replaced by the measurement of a gas stream which is as nearly as possible in thermal equilibrium with said wall.

A further object of the invention is to permit practically instantaneous measurement of temperature independently of the conditions inherent to the atmosphere which surrounds the measuring device itself and the moving plate and especially in the case of a heat treatment furnace, of the effects of temperature gradients between the very hot gases which constitute the combustion gases, for example, or certain other gases which are present in said atmosphere, and also of the effects of static or dynamic pressure of said gases, especially when the furnace is heated by means of intensive-combustion burners which produce flames having a high momentum.

To this end, the device under consideration is characterized in that it comprises a pipe through which a gas is supplied at a given pressure and flow rate into a collector having a flared shape and closed by a flat annular end-plate which is parallel to the wall and provided with a series of gas-admission holes or passageways, said annular end-plate being such as to delimit with the wall an intermediate space of small width in which a fraction of the gas flow which is injected through the passageways of the annular end-plate circulates radially and is heated in contact with the wall, a suction duct located in the axis of the supply pipe for collecting said fraction of gas substantially at the center of the intermediate space, the remainder of the injected gas being continuously driven towards the exterior and over the entire periphery of the annular end-plate while forming a gaseous guard ring, at least one thermocouple placed in the suction duct for measuring the temperature attained by the gas in contact with the wall and at least one thermocouple placed in the supply gas stream in the vicinity of the annular end-plate prior to injection of said gas into the intermediate space through the admission passageways, the function of said thermocouples being to permit direct and differential measurements.

By virtue of these arrangements, if $V_1$ is the volume per unit of time which is admitted into the supplypipe unit, said volume is greater than the volume $V_2$ which is collected by the central suction duct, the remaining fraction $V_3$ which is equal to the difference between the volumes $V_1$ and $V_2$ being continuously discharged to the exterior and over the entire periphery of the annular end-plate while forming a gaseous guard ring or barrier which serves to protect the device, especially from the surrounding atmosphere.

The device according to the invention preferably comprises a cylindrical body which surrounds the gas supply pipe, the flared collector and the suction duct, said body being provided with an outer jacket which is cooled by a circulation of coolant liquid, the regions which are left free between the outer jacket, the supply pipe and the suction duct being filled with heat-insulating material. In accordance with another characteristic feature, the extremity of the suction duct which is remote from the wall is associated with a recycling injector, the gas which has collected within the duct being drawn into said injector, then returned to the collector and mixed in this latter with the feed gas which is delivered through the supply pipe. In accordance with another characteristic feature, the flared collector has a double casing of conical shape, the space in which the gas is circulated at the outlet of the passageways formed in the annular end-plate which closes the collector being delimited in the central region thereof by a disc of refractory material which is parallel to the wall and rigidly fixed to the extremity of the suction duct.

Finally, in a preferred embodiment of the invention, the supply pipe comprises a unit for preheating the gas with variable efficiency in order that the temperature of said gas can be adjusted prior to injection into the intermediate space through the passageways of the annular end-plate.

Further characteristic features of the measuring device considered will also appear from the following description of one exemplified embodiment which is given by way of indication without any implied limitation, reference being made to the single FIGURE of the accompanying drawings which represents a diagrammatic axial sectional view of said device.

The device shown in the FIGURE is designed especially for measuring the temperature of a metallic wall 1 which is subjected to a continuous movement of displacement in front of the instrument; said wall consists, for example, of a sheet metal plate in process of heat treatment in a furnace which forms part of a rolling installation.

The measuring apparatus comprises a body 2 having a generally cylindrical shape and delimited by an outer jacket 3 within which is placed an inner casing 4, there being formed between said jacket and said inner casing a space 5 in which is mounted a tube coil 6 for the continuous circulation of a liquid which is usually water and serves to cool the body 2, said liquid being admitted into the coil 6 through a tube element 7 which fills the space 5 and is then discharged through a tube element 8, said tube elements 7 and 8 being passed through a top end-plate 9 which closes the body 2 at the end remote from the wall 1.

In accordance with the invention, the body 2 is fitted with a pipe 10 for supplying the apparatus with a measuring gas at a given pressure and flow rate, said pipe 10 being passed through the end-wall 9 by means of a leaktight bushing 11. Prior to penetration into the body 2, the pipe 10 is associated with a suitable means for heating the gas which flows through the pipe. Said means can consist in particular of a simple electric heating resistor 12 which surrounds the pipe 10 or of an auxiliary furnace or the like, a regulating device (not illustrated) being also provided for varying in accordance with requirements the temperature of the gas which passes into the apparatus. The pipe 10 is advantageously coiled in a spiral shape within the interior of the body 2 in order to permit the thermal expansion processes which arise from the flow of heated gas through the heating resistor 12. In other alternative forms, the heating means could be placed within the interior of the body 2.

At the end which is located within the interior of the body 2, the pipe 10 is connected to an inverted cup 13 having an extension in the form of a cylindrical sleeve 14 which is closed by a base 15 at that extremity of said sleeve which penetrates into the cup, said base being in turn pierced by holes such as the hole 16 through which the gas passes into the sleeve. The gas which flows through said holes 16 progresses within the sleeve 15 in the direction of the arrows 17, then passes out into a flared collector 18 which is constituted in the embodiment herein described by two parallel sheet-metal elements 19 and 20 having a generally conical shape and secured in rigidly fixed relation to the base of the apparatus by means of a circular ring 21. Said ring is provided with a series of holes or passageways 22 which are uniformly spaced in said ring and permit the gas derived from the pipe 10 to pass out of the body 2 and to be distributed after being injected into a space 23 of small thickness which is formed between the wall 1 whose temperature is to be measured and the body 2. Within said space, a fraction of the gas which passes out of the apertures 22 follows a substantially radial path as represented diagrammatically in the FIGURE by the arrows 24, then reaches the center of the space 23, is recirculated in the direction of the arrows 25 within a substantially axial suction duct 26. Said duct is rigidly fixed at the lower end thereof to a disc 27 formed of suitable refractory material which serves to delimit the circulation space 23 in conjunction with the annular end-plate 21. There is mounted within the duct 26 a thermocouple 28, the electric connecting leads 29 of which traverse the body 2 axially through a guide tube 30. Said tube 30 is in turn surrounded by a sleeve formed of two casing tubes as designated respectively by the reference numerals 31 and 32 for circulating a suitable coolant and especially water. Said circulation is carried out by means of connecting-pipes 33 and 34 which are in turn connected respectively to the interior of the casing-tubes 31 and 32 and is intended to limit the heating of the components which are placed within the interior of the body 2. If this precaution were not taken, the resultant differential expansion processes would react on the position of the annular end-plate 21 with respect to the body 2, thereby modifying the geometry of the space 23, impairing the accuracy of measurement to a considerable extent and even incurring the danger of loosening the annular end-plate, breaking the connection between the end-plate and the body and causing damage to the apparatus. At the extremity 35 which is remote from the disc 27, the duct 26 opens beneath the base 15 and forms together with the sleeve 14 and said base a suction injector which causes the gas to deviate as shown by the arrows 36, then to be recycled within the apparatus by being mixed in the collector 18 with the gas which is supplied from the pipe 10 through the holes 16. The complete body 2 is filled with suitable heat-insulating material 37 in those regions which are left free between the pipe 10, the inner casing 4, the casing-tube 32 and the collector 18.

Finally, the apparatus is completed by means of one or a number of thermocouples such as 38, only one of which is shown in the FIGURE and which are intended to measure the temperature of the gas at the point of admission to the space 23, namely immediately upstream of the passageways 22 of the annular end-plate 21. Preferably, said thermocouples 38 which are thermally insulated from the remainder of the apparatus and especially embedded in the heat-insulating material 37 are placed in front of gas jets which are taken from the supply-gas stream, especially through small openings 39 which are formed in the wall 19 of the collector 18.

The operation of the measuring device under consideration can thus be readily deduced from the foregoing description: in a first method of use, the apparatus is brought to the vicinity of the continuously moving wall 1 so as to leave a free space between the disc 27 and said wall 1, the thickness of said space being limited to a small predetermined value. A measuring gas is supplied through the pipe 10, then passes through the collector 18 and is discharged through the passageways 22 of the annular end-wall 21 so that at least part of the gas flow circulates radially within the space 23. If $V_1$ in particular is the volume of gas delivered per unit of time within the pipe 10, a fraction $V_2$ of said volume passes within the space 23 in order to be recirculated through the duct 26 while another fraction $V_3$ which is complementary to $V_2$ passes radially to the exterior and forms a guard ring at the periphery of the annular end-plate 21, thereby isolating said end-plate from the surrounding atmosphere. As it comes into contact with the wall 1, the corresponding fraction of the gas is heated by convection, is then discharged through the axial duct 26 which contains the measuring thermocouple 28 and this latter transmits to the exterior of the apparatus a signal representing the temperature of said gas. At the outlet of the duct 26, the hot gas is recycled within the apparatus by means of the dynamic suction injector which is formed by the duct 26 and the sleeve 14 and said gas then mixes with the gas derived from the pipe 10. After a given time interval, the apparatus attains thermal equilibrium, whereupon the thermocouple 28 produces a signal representing the temperature of the wall 1.

Another mode of application of the apparatus according to the invention can also be contemplated and has the advantage of avoiding preliminary calibration which is necessary in the first mode of application which was explained above and accordingly permits of direct differential measurement. To this end, the feed gas which is circulated within the pipe 10 is subjected prior to admission in the body 2 to preheating by the electric resistor 12 to a temperature such that the difference between this latter immediately before penetration of the gas into the space 23 as measured by the thermocouple 38 and the temperature of the gas stream which is drawn into the axial duct 26 as measured by the thermocouple 28 is zero. Under these conditions, the heat transfer q between the radial gas stream within the space 23 and the moving wall 1 is zero. In point of fact, since the coefficient of transfer h is not zero, it can accordingly be deduced that the temperature difference $\Delta t$ between the moving wall and the gas is zero since, if S is the area of the wall which is in contact with the circulating gas, the parameters given above satisfy the relation $$q = h S \Delta t$$

By virtue of these arrangements, a temperature which is exactly equal to the temperature of the moving wall is measured either at the supply end immediately prior to injection or at the suction end. It is apparent that the only condition imposed as a result of the foregoing is that the coefficient of transfer itself should not be zero. On the other hand, its value at equilibrium is not important and this makes it possible to limit the dependence of the measurement both on the geometry of the apparatus itself, especially the diameter of this latter, and on the width or thickness of the gas-circulation space.

In the embodiment which is contemplated above, the measurement of the temperature of the moving wall is carried out as a result of preheating of the gas which achieves temperature equilibrium both at the supply end and suction end. Another mode of application which is derived from the preceding could also be adopted and this could consist in setting-up a given temperature or so-called reference temperature at the supply end and in measuring the temperature difference with the suction end in order to measure the variations in suction, for example, and therefore in the temperature of the wall.

No matter what method of measurement is employed, the device under consideration makes it possible to obtain a rapid and accurate response by reason of the efficiency of thermal equilibrium achieved between the measuring gas and the wall itself which is due in particular to the mixture of hot gas discharged through the axial duct together with the gas derived from the supply pipe.

A few numerical characteristics of construction and use of a device according to the invention are specified hereinafter by way of indication:

— temperature of the moving wall : 300° to 900° C,
— ambient temperature : 1,200° C,
— dimensions of the apparatus : external diameter : 50 to 120 mm, length : 500 mm,
— thickness of the gas circulation space : < 20 mm,
— pressure of the compressed gas : 6 bars,
— flow rate of feed gas : from 3 to 4 m³/hour,
— flow rate of liquid for cooling the body of the apparatus : 10 to 15 l/min,
— response time of the apparatus : less than 2 seconds for a given degree of preheating.

It will clearly be understood that the invention is not in any way limited to the exemplified embodiment which has more especially been described with reference to the accompanying drawings but extends to all alternative forms. In particular, although the apparatus considered is more especially suited to the problem of temperature measurement of continuously moving flat sheet-metal plates, other applications can naturally be contemplated in which it would be possible in particular to adopt much lower values both for the gas flow rates and the thickness of the circulation space. Finally, it is self-evident that the nature of the measuring gas depends on the particular conditions of use of the apparatus. It should be noted that, in the event that the apparatus is mounted directly within a furnace in an atmosphere of high-temperature combustion gases having a composition which must necessarily be maintained substantially constant, the measuring gas can be taken directly from the furnace ; this gas is first cooled to a temperature which is then adjusted by the preheating device which is provided in the supply pipe before penetrating into the body of the apparatus itself, said gas being circulated by means of a compressor or the like which is located outside the furnace.

What we claim is:

1. A device for measuring the temperature of a wall and especially a metallic wall, wherein said device comprises a collector, a flat annular end plate for said collector, a pipe through which a gas is supplied at a given pressure and flow rate into said collector having a flared shape and closed by said flat annular end-plate which is parallel to the wall and provided with a series of gas-admission passageways, a suction duct, said annular end-plate being such as to delimit with the wall an intermediate space of small width in which a fraction of the gas flow which is injected through the passageways of the annular end-plate circulates radially while being heated in contact with the wall and is recirculated through said suction duct, said suction duct being located in the axis of the supply pipe which collects said fraction of gas substantially at the center of the intermediate space, the remainder of the injected gas being continuously driven towards the exterior and over the entire periphery of the annular end-plate while forming a gaseous guard ring, at least one thermocouple placed in the suction duct for measuring the temperature attained by the gas in contact with the wall and at least one thermocouple placed in the supply gas stream in the vicinity of the annular end-plate prior to injection of said gas into the intermediate space through the passageways, the function of said thermocouples being to permit direct and differential measurements.

2. A measuring device according to claim 1, wherein said device has a cylindrical body which surrounds the gas supply pipe as well as the flared collector and the suction duct, said body being provided with an outer jacket which is cooled by a circulation of coolant liquid, the regions which are left free between the outer jacket, the supply pipe and the suction duct being filled with heat-insulating material.

3. A measuring device according to claim 1, wherein the extremity of the suction duct which is remote from the wall is associated with a recycling injector, the gas which is collected within the duct being drawn into said injector and returned into the collector to be mixed therein with the supply gas which is delivered through the pipe.

4. A measuring device according to claim 1, wherein the flared collector is formed of a double casing having a conical shape, the space for circulating the gas discharged from the passageways formed in the annular end-plate which closes the collector being delimited in the central region of said space by a disc of refractory material which is parallel to the wall and rigidly fixed to the extremity of the suction duct.

5. A measuring device according to claim 1, wherein the supply pipe comprises a gas preheating unit having variable efficiency which serves to adjust the temperature of said gas prior to injection into the intermediate space through the passageways of the annular end-plate.

6. A measuring device according to claim 1, wherein the supply pipe comprises a spirally coiled section in order to permit of differential expansion processes.

* * * * *

UNITED STATES PATENT OFFICE
CERTIFICATE OF CORRECTION

Patent No. 3,691,840        Dated September 19, 1972

Inventor(s) Jacques Dufour; Paul H. Perroud; Jacques Petres; and Jean Rebiere

It is certified that error appears in the above-identified patent and that said Letters Patent are hereby corrected as shown below:

--[73] Assignee: Societe Anonyme Heurtey-- was omitted.

Signed and sealed this 19th day of March 1974.

(SEAL)
Attest:

EDWARD M. FLETCHER, JR.
Attesting Officer

C. MARSHALL DANN
Commissioner of Patents